United States Patent [19]
Hashimoto

[11] Patent Number: 4,616,110
[45] Date of Patent: Oct. 7, 1986

[54] AUTOMATIC DIGITAL TELEPHONE ANSWERING APPARATUS
[75] Inventor: Kazuo Hashimoto, Tokyo, Japan
[73] Assignee: Hashimoto Corporation, Tokyo, Japan
[21] Appl. No.: 631,755
[22] Filed: Jul. 17, 1984
[30] Foreign Application Priority Data
   Jul. 18, 1983 [JP] Japan ................................ 58-130549
[51] Int. Cl.⁴ .......................................... H04M 1/64
[52] U.S. Cl. ................................ 179/6.03; 179/6.16; 179/6.2; 179/7 R
[58] Field of Search ............... 179/6.01-6.2, 179/18 B, 90 BB, 90 BD, 7 R; 360/32
[56] References Cited
U.S. PATENT DOCUMENTS
3,879,585  4/1975  Bobeck et al. ................. 179/90 BB
3,943,289  3/1976  Sheldon et al. ......................... 179/6
4,010,454  3/1977  Bobeck et al. .............. 340/174 TF
4,160,125  7/1979  Bower et al. .......................... 179/6
4,255,618  3/1981  Danner et al. .................... 364/513.5
4,327,251  4/1982  Fomenko et al. ..................... 381/77
4,359,607  11/1982 Hannig et al. ..................... 179/6.03
4,389,546  6/1983  Glisson et al. .................... 179/18 B
4,468,813  8/1984  Burke et al. .......................... 455/38

Primary Examiner—Stafford D. Schreyer
Attorney, Agent, or Firm—Lowe Price LeBlanc Becker & Shur

[57] ABSTRACT

An automatic telephone answering apparatus is arranged such that an outgoing message stored in an IC memory is read out and converted to an audio analog signal which is then sent out onto telephone lines, and thereafter an incoming message sent from a calling party is converted to a digital signal which is then stored in one of a plurality of other IC memories.

13 Claims, 6 Drawing Figures

AUTOMATIC DIGITAL TELEPHONE ANSWERING APPARATUS

BACKGROUND OF THE INVENTION

The present invention relates to an automatic telephone answering apparatus.

Most conventional telephone answering apparatuses send out an outgoing message reproduced from a magnetic outgoing message tape when an incoming call is received, and allow a calling party, such as a customer, to record his voice on a magnetic incoming message tape. Another conventional automatic telephone answering apparatus is described in U.S. patent application Ser. No. 471,217 now U.S. Pat. No. 4,556,761. According to this automatic telephone answering apparatus, instead of recording the outgoing message on magnetic tape, a speech synthesis device is used to generate an outgoing message upon reception of an incoming call. Thereafter, a message of the calling party is recorded on an incoming message tape.

SUMMARY OF THE INVENTION

It is a first object of the present invention to provide an automatic telephone answering apparatus capable of reproducing an outgoing message and recording/reproducing an incoming message by a calling party by using a speech synthesizing/analyzing means such as an adaptive delta modulator and a memory means for storing information as digital signals.

It is a second object of the present invention to provide an automatic telephone answering apparatus capable of recording a new outgoing message at a microphone which replaces an old outgoing message.

It is a third object of the present invention to provide an automatic telephone answering apparatus which is reengaged only upon sending out the outgoing message when a call is received after messages from calling parties are recorded at all memory locations in an IC memory for storing incoming messages.

In order to achieve the above objects of the present invention, there is provided an automatic telephone answering apparatus comprising: converting means such as an adaptive delta modulator for converting an audio analog signal to a digital signal or a digital signal to an audio analog signal; a first integrated circuit memory such as a random access memory for storing an outgoing message as a digital signal converted by said converting means; a plurality of second integrated circuit memories such as random access memories for storing a digital signal which is obtained by conversion by said converting means of an incoming message of a calling party through a telephone line; ringing signal detecting means for detecting a ringing signal from a telephone line to form a loop circuit; a register for counting the number of incoming calls; outgoing message sending means for reading out the digital signal of the outgoing message in accordance with an output signal from said ringing signal detecting means and sending onto the telephone line the outgoing message as the audio analog signal obtained by conversion of the digital signal of the incoming message by said converting means; writing means for storing the digital signal in a corresponding one of said plurality of second integrated circuit memories which corresponds to a count of said register, the digital signal being obtained by conversion by said converting means of the incoming message of the calling party through the telephone line after the outgoing message is sent out; disengaging means for opening the loop circuit and disengaging said apparatus after the incoming message is stored in said corresponding one of said plurality of second integrated memories; and reading means for reading out the incoming message from said corresponding one of said plurality of second integrated circuit memories through said converting means.

According to the automatic telephone answering apparatus having the configuration described above, when an incoming call is received, the outgoing message comprising a digital signal is read out from the first integrated circuit memory. The readout digital signal is converted by the converting means to an audio analog signal which is then sent onto the telephone line. Thereafter, the incoming message is converted by the converting means to a digital signal which is then stored in one of the second integrated circuit memories. In this manner, the outgoing and incoming messages are stored as digital signals in IC memories such as RAMs. The telephone answering apparatus according to the present invention has a smaller number of mechanically movable members, such as a tape, a tape drive mechanism and a magnetic head, than that of the conventional apparatus using magnetic tape, thereby decreasing the number of parts which require relatively frequent replacement and achieving a compact apparatus.

DETAILED DESCRIPTION OF THE PREFERRED EMBODIMENT

Figure 1A:
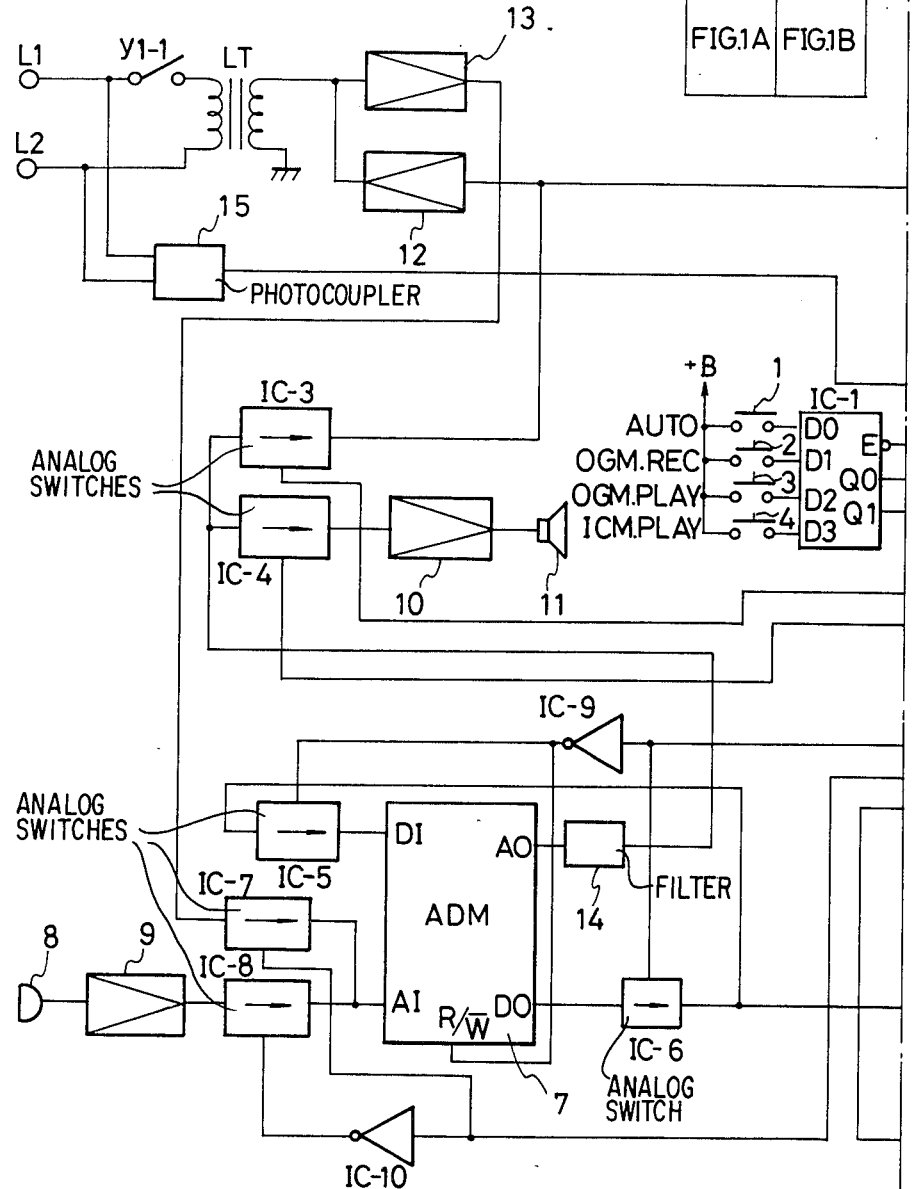
FIGS. 1A and 1B are a block diagram showing the main part of an automatic digital telephone answering apparatus according to an embodiment of the present invention.
Figure 1B:
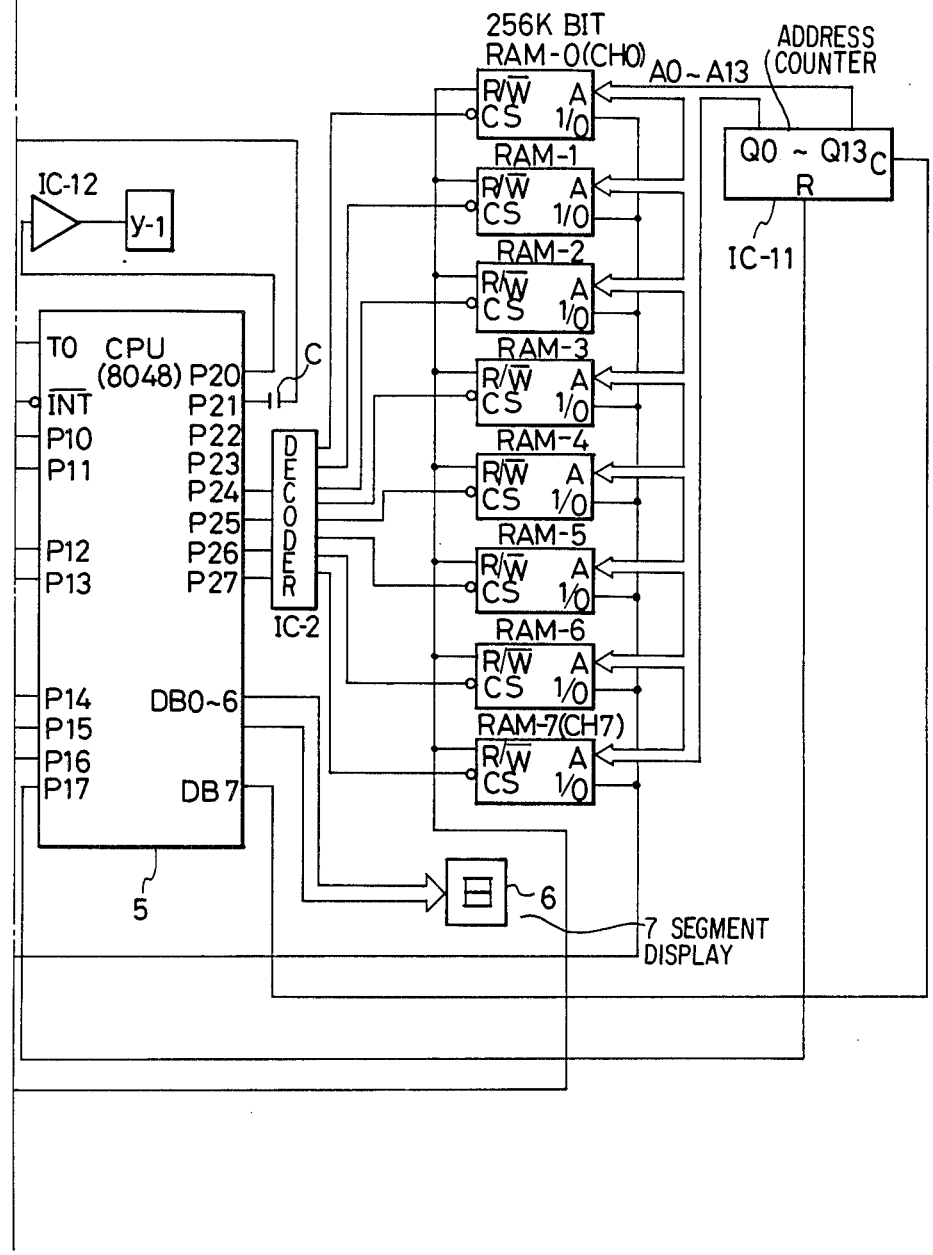

FIGS. 1A and 1B are a block diagram showing the main part of an automatic telephone answering apparatus according to an embodiment of the present invention. Reference numeral 1 denotes a pushbutton switch which is turned on when the automatic telephone answering apparatus is set in the standby state. Reference numeral 2 denotes a pushbutton switch which is turned on when an outgoing message (OGM) is recorded. Reference numeral 3 denotes a pushbutton switch which is turned on when the outgoing message (OGM) is reproduced. Reference numeral 4 denotes a pushbutton switch for reproducing an incoming message (ICM) from a calling party (to be described later). Reference symbol IC-1 denotes an encoder for converting an output from each of the above-mentioned pushbutton switches to a binary signal. Reference numeral 5 denotes a microprocessor (to be referred to as a CPU hereinafter). The CPU 5 comprises, for example, a microprocessor 8048. A control program is prestored in a memory in the CPU 5 to control the automatic telephone answering apparatus. A test terminal TO of the CPU 5 is connected to a photocoupler 15 for detecting a ringing signal from telephone lines L1 and L2. Ports P10 and P11 of the CPU 5 are respectively connected to corresponding output terminals of the encoder IC-1 for receiving the outputs from the pushbutton switches 1 to 4. Ports P12, P13, P14 and P15 of the CPU 5 serve as output ports, respectively. Outputs from the ports P12, P13, P14 and P15 control the input/output operation of an adaptive delta modulator 7, the output operation of an amplifier 9, the input operations of amplifiers 10 and 12, and the output operation of an amplifier 13 through analog switches IC-3 to IC-8. An output from an output port P16 of the CPU 5 controls the read/write operation of random access memories RAM-0 to RAM-7 as IC memories. An output from an output port P17 of the CPU 5 resets an address counter IC-11 for addressing the random access memories RAM-0 to RAM-7. Data bus terminals DB0 to DB6 serve as output ports, respectively. Outputs from the data bus terminals DB0 to DB6 represent, as a channel number, which one of the random access memories RAM-0 to RAM-7 is used and are supplied to a 7-segment display 6. A data bus terminal DB7 as an output port supplies a clock signal to the address counter IC-11.

The random access memory RAM-0 stores the outgoing message, while the random access memories RAM-1 to RAM-7 store incoming messages from the calling parties. The adaptive delta modulator (to be referred to as an ADM hereinafter) 7 converts an audio analog signal to a digital signal which is then recorded (stored) in any one of the random access memories RAM-1 to RAM-7 at a 16K bit rate. The ADM 7 also converts the digital data stored in the corresponding random access memory to an audio analog signal. One random access memory stores/accesses audio data for 16 seconds. Chip select terminals CS of the random access memories RAM-0 to RAM-7 are connected to output ports P24 to P27 of the CPU 5 through a decoder IC-2. The random access memories RAM-0 to RAM-7 are selected in response to the signals from the output ports P24 to P27. An output port P20 of the CPU 5 generates an output when the CPU 5 receives the ringing signal from the photocoupler 15 through the test terminal TO. The output from the output port P20 is supplied to a relay Y-1 through a buffer IC-12, so that the relay Y-1 is self-held. A contact y1-1 of the relay Y-1 is closed to form a loop circuit. An output from an output port P21 is used to supply a beep tone to the telephone lines L1 and L2. The beep tone is produced through a capacitor C, the amplifier 12 and a line transformer LT in accordance with a program.

Reference numeral 14 denotes a filter for eliminating noise from the output generated from the ADM 7.

The operation of the automatic telephone answering apparatus will now be described with reference to FIGS. 2 to 5.

Figure 2:
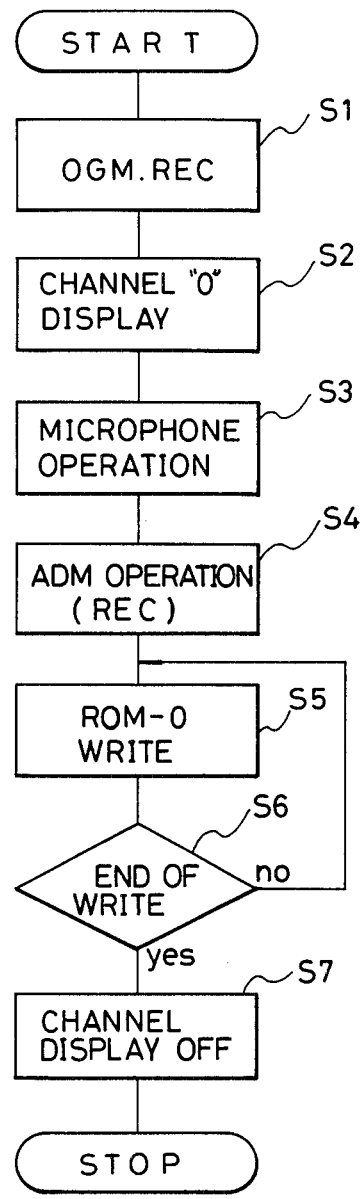
FIG. 2 is a flow chart for explaining outgoing message recording in the apparatus shown in FIG. 1.

The operation for storing (recording) the outgoing message (OGM) in the random access memory RAM-0 is first described with reference to the flow chart of FIG. 2.

When the operator depresses the pushbutton switch (OGM-REC) 2 to record the outgoing message, data is supplied to the input ports P10 and P11 of the CPU 5 through the encoder IC-1. At the same time, an interrupt is supplied to an interrupt terminal INT. The CPU 5 causes the display 6 to display "0" through the data bus terminals DB0 to DB6 in accordance with the control program. Meanwhile, the chip select terminal CS of the random access memory RAM-0 is set at L level through the output ports P24 to P27 and the decoder IC-2, so that the random access memory RAM-0 is selected, in steps S1 and S2. At this time, the output port P15 is also set at L level through an inverter IC-10 to turn on the analog switch IC-8. In this state, the operator can record his/her voice at a microphone 8 in step S3. When the operator records his voice, the output from the microphone 8 is supplied to an analog input terminal A1 of the ADM 7 through the amplifier 9 and the analog switch IC-8. Simultaneously, the output port P14 of the CPU 5 is set at H level in accordance with the control program, and a read/write terminal R/W of the ADM 7 is set at L level through an inverter IC-9 in step S4. The output from the inverter IC-9 causes the analog switch IC-6 to be turned on, so that the analog output from the microphone 8 is converted into a digital signal through the analog input terminal A1 and a digital output terminal D0 of the ADM 7. This digital signal is supplied to an input/output terminal I/O of the random access memory RAM-0 through the analog switch IC-6 and is written therein in step S6. In this case, the terminals R/W of the random access memories RAM-0 to RAM-7 are set at L level in response to the output from the output port P16 in accordance with the control program. The random access memories RAM-0 to RAM-7 can be driven by address signals A0 to A13 from the address counter IC-11 which performs counting in response to the pulse from the data bus terminal DB7 of the CPU 5, and the outgoing message is written in the random access memory RAM-0. When the 256K bit random access memory RAM-0 becomes full after recording is performed for about 16 seconds (i.e., when the CPU 5 count corresponds to the 256K-th bit pulse generated from the data bus terminal DB7) in step S6, the CPU 5 causes the display 6 to be turned off, so that the numerical value "0" disappears to indicate the end of recording in step S7. In this case, the counter IC-11 is reset in response to the output from the output port P17.

Figure 3:
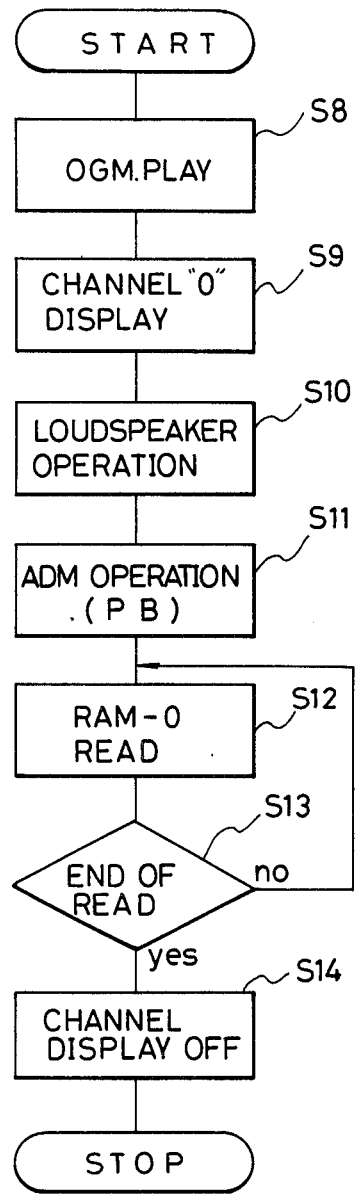
FIG. 3 is a flow chart for explaining outgoing message reproduction in the apparatus shown in FIG. 1.

The operation for playing or reproducing the outgoing message (OGM) recorded in the random access memory RAM-0 will now be described with reference to the flow chart of FIG. 3. When the pushbutton switch (OGM-PLAY) 3 is turned on, the CPU 5 detects the output from the encoder IC-1 in step S8. The CPU 5 then causes the display 6 to display a numerical value "0" in step S9. At the same time, the output port P14 is set at L level, and then the terminal R/W of the ADM 7 is set at H level through the inverter IC-9. The ADM 7 is thus set in the play mode. Simultaneously, when the outputs from the output ports P24 to P27 are supplied to the decoder IC-2, the decoder IC-2 generates the output to select the random access memory RAM-0. The terminal R/W of the random access memory RAM-0 is set at H level in response to the output from the output port P16, so that the random access memory RAM-0 is set at the read or play mode. The pulse output from the data bus DB7 drives the address counter IC-11 which then supplies address signals A0 to A13 to the random access memory RAM-0. The audio data are sequentially read out from the terminal I/O of the random access memory RAM-0. These audio data are supplied to a digital input terminal D1 of the ADM 7 through the analog switch IC-5 which is kept on in response to the H level signal from the inverter IC-9. These data are subjected to speech synthesis, and a synthesized analog signal appears at an analog output terminal A0 of the ADM 7. The filter 14 eliminates a noise component from the analog signal which is generated during speech synthesis. The noise free analog signal is then supplied to the amplifier 10 through the analog switch IC-4. The amplified signal from the amplifier 10 is then produced at a loudspeaker 11. These sequences are executed in steps S10, S11 and S12. In the same manner as described above, when the CPU 5 detects that the count of pulses from the data bus terminal DB7 has reached the 256K-th bit pulse, and the outgoing message is played, the CPU 5 causes the display 7 to be turned off (steps S13 and S14).

Figure 4:
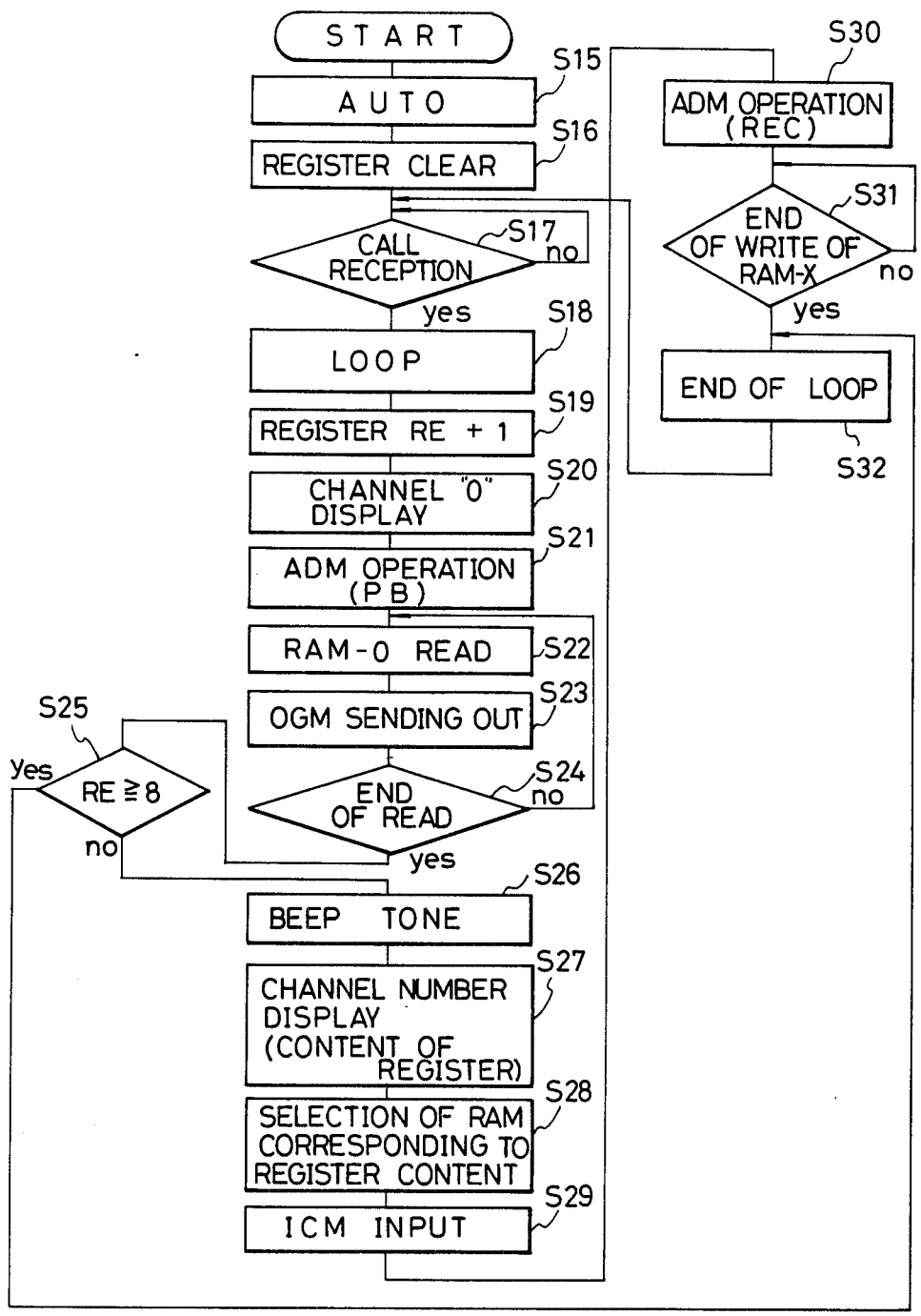
FIG. 4 is a flow chart for explaining the reception operation of the apparatus shown in FIG. 1 connected to a telephone set.

The operation will be described with reference to the flow chart of FIG. 4 wherein the automatic telephone answering apparatus is connected to a telephone set.

The operator depresses the pushbutton switch (AUTO) 1 to connect the automatic digital telephone answering apparatus to the telephone set while the apparatus is set in the standby mode (step S15). When the CPU 5 detects that the pushbutton switch (AUTO) 1 is turned on and the automatic telephone answering apparatus is set in the standby mode, a register RE in the CPU 5 is cleared in accordance with the control program (step S16). When the ringing signal is received through the telephone lines L1 and L2, the test terminal TO of CPU 5 receives the ringing signal through the photocoupler 15, so that the CPU 5 detects this ringing signal (step S17). The CPU 5 generates an output from the output port P20 to energize the relay Y-1 through the buffer IC-12, thus forming a loop circuit through its contact y1-1 (step S18). At the same time, the register RE is programmed to increase its count every time an incoming call (ringing signal) is received. The count of the register RE is set at "1" in the initial state (step S19). After the numerical value "0" is displayed on the display 6 in step S20, the ADM 7 is set in the play mode, as described above, in step S21. The data is read out from the random access memory RAM-0 and is supplied as the outgoing message OGM (speech-synthesized output) to the telephone lines L1 and L2 through the analog switch IC-5, the digital input terminal D1 and the analog output terminal A0 of the ADM 7, the filter 14, the analog switch IC-3, the amplifier 12 and the line transformer LT in steps S22, S23 and S24. The CPU 5 checks whether or not any one of the random access memories is still available to write an incoming message after the outgoing message is sent to the calling party. In this embodiment, since seven random access memories (RAM-1 to RAM-7) are prepared to store the incoming messages, the CPU 5 checks whether or not the count of the register RE exceeds "7" in step step S25. If NO in step S25, a programmed beep tone is generated from the output port P21 and is amplified by the amplifier 21, so that the amplified beep tone is sent out onto the telephone lines L1 and L2 to cause the calling party to understand that the apparatus is set in the recording mode (step S26). The CPU 5 causes the display 6 to display a numerical value "1" corresponding to the count of the register RE in step S27. The count "1" of the register RE is decoded by the decoder IC-2, and an output from the decoder IC-2 selects the random access memory RAM-1 (step S28). In addition, the CPU 5 causes the random access memory RAM-1 to be set in the write or recording mode in the same manner as previously described. The CPU 5 also causes the ADM 7 to be set in the recording mode. For these reasons, the incoming message ICM of the calling party is written in the random access memory RAM-1 through the line transformer LT, the amplifier 13, the analog switch IC-7, the ADM 7 and the analog switch IC-6 (steps S29 and S30). When writing of the incoming message is completed (step S31), the relay Y-1 is deenergized in accordance with the control program to open the loop circuit (step S32). The apparatus is thus set in the standby mode to await the next call in step S17. Every time a call is received in the manner described above, the count of the register RE is incremented by one. The outgoing message is read out from the random access memory RAM-0, and the one of the random access memories RAM-1 to RAM-7 which corresponds to the count of the register RE is selected. The incoming message from the calling party is thus written in the selected random access memory. When the count of the register RE reaches "8", an incoming message cannot be written in any of the random access memories RAM-1 to RAM-7. In this case, no beep tone is generated after the outgoing message is sent to the calling party. Steps S25 to S32 are repeated to open the loop circuit. It should be noted that another signal discriminated from the beep tone can be sent to open the loop circuit.

Figure 5:
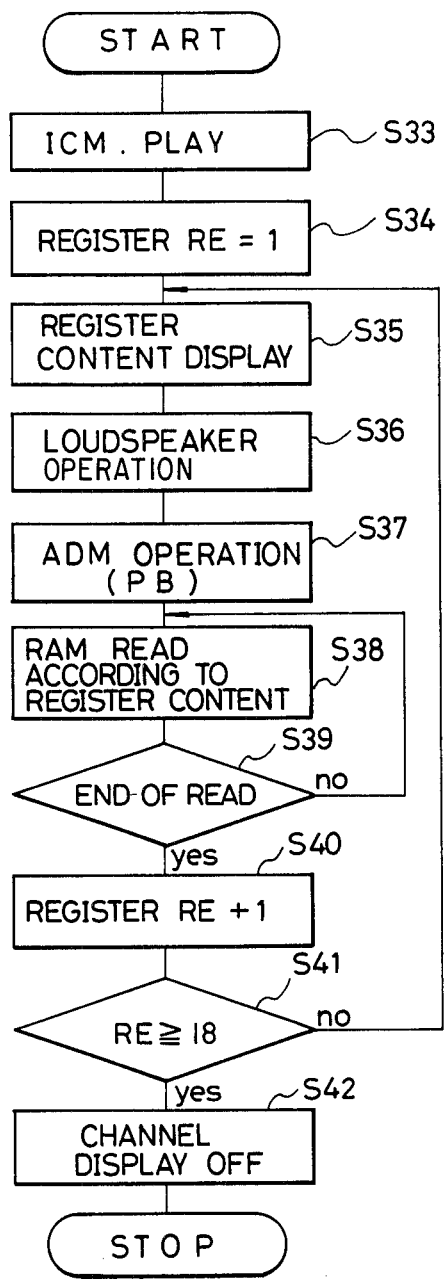
FIG. 5 is a flow chart for explaining incoming message reproduction in the apparatus shown in FIG. 1.

The operation will now be described with reference to the flow chart of FIG. 5 when the incoming messages ICM stored in the RAM are read out and reproduced.

When the pushbutton switch (ICM-PLAY) 4 is depressed, the CPU 5 detects its key input signal to set the register RE at count "1" (steps S33 and S34). The loudspeaker 11 is energized and the ADM 7 is switched to the play mode (steps S36 and S37). The one of the random access memories RAM-1 to RAM-7 which corresponds to the count of the register RE (in this case, the random access memory RAM-1) is selected. The data is read out from the random access memory RAM-1 and is reproduced at the loudspeaker 11, so that the called party receives the incoming message (steps S38 and S39). When the incoming message is read out and reproduced from the random access memory RAM-1, the count of the register RE is incremented by one to "2" (step S40), and so the data from the random access memory RAM-2 is read out and reproduced. The increment operation of the register RE is repeated until the count of the register RE exceeds "7". Steps S35 to S40 are repeated until all the incoming messages are read out and reproduced from the RAMs of the random access memories RAM-1 to RAM-7 which respectively store the incoming messages. When the count of the register RE exceeds "7" (step S41), the display 6 is turned off in step S42 to complete the play mode of the incoming messages.

In the above embodiment, the IC memory is constituted by a random access memory but a bubble memory can also be used.

What is claimed is:

1. An automatic telephone answering apparatus comprising:
 converting means for coverting an audio analog signal to a digital signal or a digital signal to an audio analog signal; a first integrated circuit memory for storing an outgoing message as a digital signal converted by said converting means; a plurality of second integrated circuit memories for storing a digital signal which is obtained by conversion by said converting means of an incoming message of a calling party through a telephone line, ringing signal detecting means for detecting a ringing signal from a telphone line to form a loop circuit; a register for counting and storing the number of incoming calls; outgoing message sending means for reading out the digital signal of the outgoing message in accordance with an output signal from said ringing signal detecting means and sending onto the telephone line the outgoing message as the audio analog signal obtained by conversion of the digital signal of the message by said converting means; writing means for storing the digital signal in a corresponding one of said plurality of second integrate ciruit memories which corresponds to a count of said register, the digital signal being obtained by conversion by said converting means of the incoming message of the calling party through the telephone line after the outgoing message is sent out, disengaging means for opening the loop circuit and disengaging said apparatus after the incoming message is stored in said corresponding one of said plurality of second integrated memories; reading means for reading out the incoming message from said corresponding one of said plurality of second integrated circuit memories through said converting means and disengaging means for opening the loop circuit and disengaging said apparatus after the outgoing message is sent when said count fo incoming calls in said register exceeds the number of said plurality of second integrated circuit memories.

2. An apparatus according to claim 1, wherein said first and second integrated circuit memories comprise random access memories, respectively.

3. An apparatus according to claim 2, further comprising input means for entering the outgoing message in said first intergrated circuit memory through said converting means.

4. An apparatus according to claim 1, wherein said first and second integrated circuit memories comprise bubble memories, respectively.

5. An apparatus according to claim 1, further comprising a display means for displaying the number of incoming calls.

6. An improved automatic telephone answering apparatus as recited in claim 1 wherein said converting means comprises adaptive delta modulating means.

7. An improved automatic telephone answering apparatus as recited in claim 1 wherein said first and second integrated circuit memories comprise random access memories.

8. An improved automatic telphone answering apparatus as recited in claim 1 wherein said second integrated circuit memories are of fixed storage capacities for storing incoming messages of limited times.

9. An automatic telephone answering apparatus comprising: converting means for converting an audio analog signal to a digital signal or a digital signal to an audio analog signal; first storing means for storing an outgoing message as a digital signal converted by said converting means; a plurality of second storing means for storing a digital signal which is obtained by conversion by said converting means of an incoming message of a calling party through a telephone line; ringing signal detecting means for detecting a ringing signal from a telephone line to form a loop circuit; a register for counting and storing the number of incoming calls and for sequentially selecting a corresponding one of said plurality of second storing means in dependence on the number of incoming calls stored in said register; outgoing message sending means for reading out the digital signal of the outgoing message from said first storing means in accordance with an output signal from said ringing signal detecting means and sending onto the telephone line the outgoing message as the audio analog signal obtained by conversion of the digital signal of the outgoing message by said converting means; writing means for storing the digital signal in said corresponding one of said plurality of second storing means selected by said register, the digital signal being obtained by conversion by said converting means of the incoming message of the calling party through the telphone line after the outgoing message is sent out; disengaging means for opening the loop circuit and disengaging said apparatus after the incoming message is stored in said corresponding one of said plurality of second storing means, reading means for reading out the incoming message from said corresponding one of said plurality of second storing means through said converting means; and disengaging means for opening the loop circuit and disengaging said apparatus after the outgoing message is sent when said count of incoming calls in said register exceeds the number of said plurality of second integrated circuit memories.

10. In an automatic telephone answering apparatus including digital means for storing data representative of outgoing messages, first converting means for converting the data to output analog audio signals conveying said outgoing messages, the improvement comprising:

second converting means for converting incoming analog audio signals to digital data, random access storage means for storing the digital data, and reading means for reading out the stored digital data representing incoming messages from said random access storage means through said converting means, said random access storage means including a sequence of memories for storing a corresponding sequence of incoming messages therein together with addressing means for addressing a selected one of said memories and for accessing the message stored therein, wherein said sequence of memories comprises a predetermined number of memories, further comprising counting means for counting the number of incoming messages stored in said memories and for preventing acceptance of additional incoming messages when each of the number of memories has stored an incoming message.

11. An improved automatic telephone answering apparatus as recited in claim 10 further comprising means for automatically incrementing said counting means in response to an incoming call.

12. An improved automatic telephone answering apparatus as recited in claim 10 further comprising output means receiving said stored digital data from said reading means for outputting the stored message to a user.

13. An improved automatic telephone answering apparatus as recited in claim 12 wherein said outputting means comprises speech synthesizing means.

* * * * *